United States Patent [19]

Antonsen et al.

[11] 4,163,077
[45] Jul. 31, 1979

[54] CONTAMINATION-TOLERANT PRESSURE-SENSITIVE ADHESIVE TAPE

[75] Inventors: Stephen A. Antonsen, Vancouver, Canada; David P. Boaz, Woodbury, Minn.

[73] Assignee: Minnesota Mining and Manufacturing Company, St. Paul, Minn.

[21] Appl. No.: 897,851

[22] Filed: Apr. 19, 1978

[51] Int. Cl.² .............................................. C09J 7/02
[52] U.S. Cl. ............................... 428/355; 260/27 BB; 128/287; 428/40; 352; 521
[58] Field of Search ................. 428/355, 40, 352, 521; 260/27 BB; 128/287

[56] References Cited

U.S. PATENT DOCUMENTS

| | | |
|---|---|---|
| 3,625,752 | 12/1971 | Korpman .................. 260/27 BB |
| 3,787,531 | 1/1974 | Dahlquist .................. 260/27 BB |
| 3,932,328 | 1/1976 | Korpman .................. 260/27 BB |
| 3,956,223 | 5/1976 | Chiang ........................ 428/355 |
| 3,993,613 | 11/1976 | Doss .......................... 260/27 BB |
| 4,024,312 | 5/1977 | Korpman ...................... 428/343 |
| 4,028,292 | 6/1977 | Korpman .................. 260/27 BB |
| 4,080,348 | 3/1978 | Korpman .................. 260/27 BB |

Primary Examiner—Elis P. Robinson
Attorney, Agent, or Firm—Cruzan Alexander; Donald M. Sell; Richard E. Brink

[57] ABSTRACT

Normally tacky and pressure-sensitive adhesive tape which displays good adhesion and shear properties, even when contaminated with dust, e.g., talcum powder. The adhesive is a rubbery block copolymer (especially styrene-isoprene-styrene), tackified with a combination of certain liquid and solid tackifiers. The tape is especially useful as a closure for disposable diapers.

11 Claims, 1 Drawing Figure

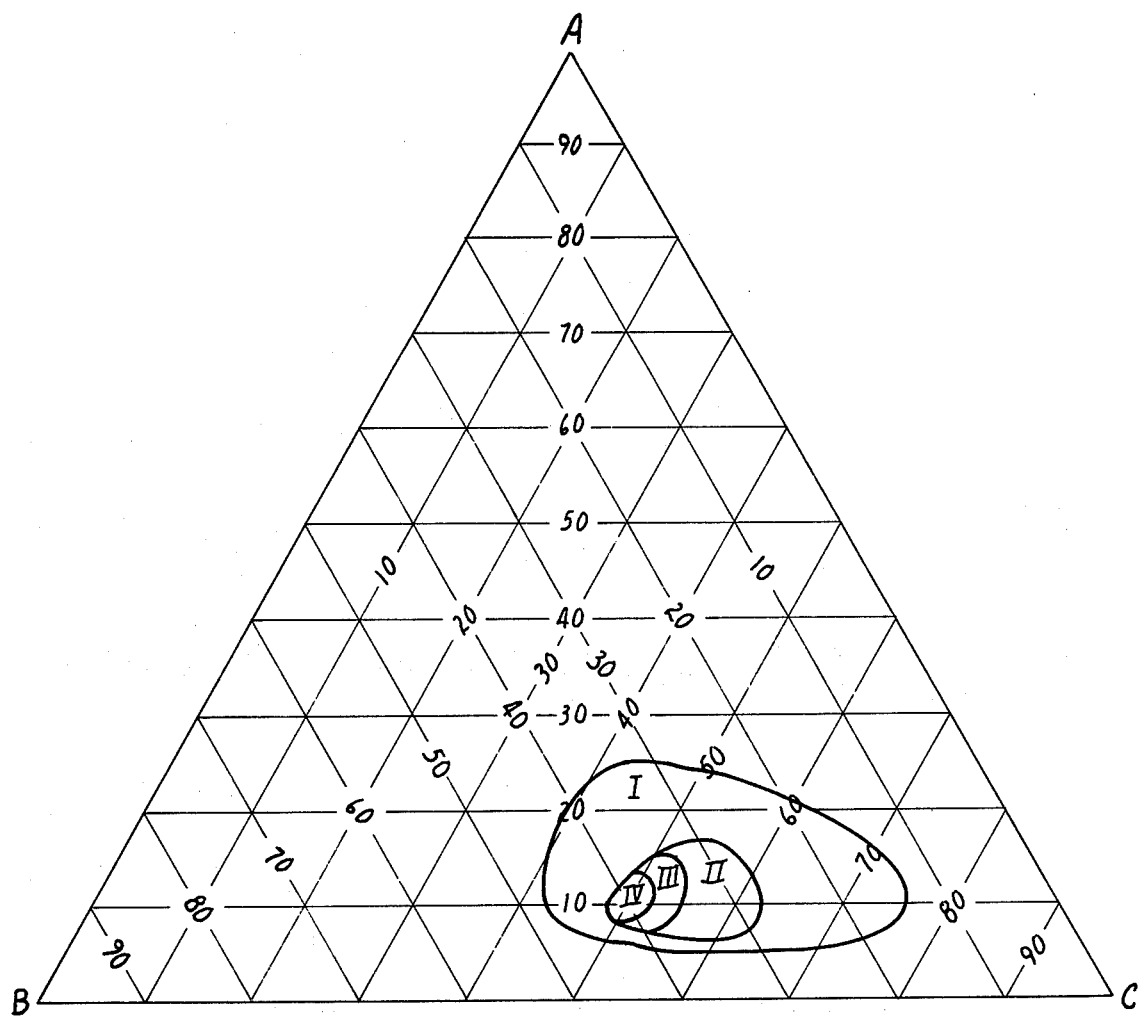

CONTAMINATION-TOLERANT PRESSURE-SENSITIVE ADHESIVE TAPE

BACKGROUND OF THE INVENTION

This invention relates to normally tacky and pressure-sensitive adhesive tape, especially tape having utility as a closure for disposable diapers.

While disposable diapers have been commercially available for at least the past 30 or 40 years, their use has increased dramatically in the last decade. Much of the present commercial success of disposable diapers can be attributed to the development of pressure-sensitive adhesive tape closure systems which replace the safety pins that had been employed for more than a century.

Disposable diapers typically comprise an absorbent filler material and an outer moisture-impervious polyethylene film. The diapers are generally so configured that when they are placed on an infant, they are folded so that two adjacent edges are either juxtaposed or overlapped, with a strip of normally tacky and pressure-sensitive adhesive tape being used to hold the edges together.

In applying a disposable diaper to a baby, a parent typically shakes talcum powder on one hand, rubs his hands together, and then transfers the powder from his hands to the baby. In the process, the polyethylene film is often sprinkled with powder. The diaper is then folded into position, at which time the strip of pressure-sensitive adhesive tape, normally attached to and folded around one edge of the diaper, is unfolded and applied to the opposite edge. Talcum powder (talc), however, contaminates the surface of conventional pressure-sensitive adhesives so that their ability to adhere is greatly reduced. This loss of adhesive properties is especially pronounced in the case of those adhesives which are most commonly employed in the manufacture of tape products; indeed, talc is often used to reduce tackiness, e.g., by applying it to the sticky edges of rolls of tape.

SUMMARY

The present invention provides a normally tacky and pressure-sensitive adhesive tape which has especially appealing properties for use as a diaper closure. The pressure-sensitive adhesive employed in the tape adheres firmly to polyethylene film, even when the surface of the adhesive, the polyethylene, or both, are contaminated with talc. Not only does the adhesive adhere firmly, but it is also capable of resisting the forces of shear which are applied to tape diaper closures, especially by an active infant.

In accordance with the invention, a sheet backing is provided with a layer of normally tacky and pressure-sensitive adhesive which consists essentially of a blend of
 (a) 5-25 parts by weight of rubbery synthetic block copolymer which is selected from the class consisting of
  (1) A-B, A-B-A or blends of A-B and A-B-A polymers wherein A is a polymer of styrene and B is selected from the class consisting of homopolymers of isoprene and copolymers of ethylene and butylene and
  (2) radial or teleblock copolymers consisting of several polystyrene-terminated elastomeric branches, each branch being a homopolymer of isoprene extending from a central hub;
 (b) 15-50 parts by weight of polyterpene-type tackifier resin which is solid at room temperature, and
 (c) 40-75 parts by weight of polyterpene-type tackifier resin which is liquid at room temperature.

Preferred compositions consist essentially of 6-17 parts by weight of block copolymer (linear, as disclosed in U.S. Pat. No. 3,239,478, or radial, as disclosed in U.S. Pat. No. 3,281,383), 48-63 parts by weight liquid polyterpene-type tackifier, and 27-43 parts by weight solid polyterpene-type tackifier. Still more preferred compositions contain 7-15 parts block copolymer, 48-55 parts liquid tackifier, and 33-42 parts solid tackifier. In all cases, the total number of parts equals 100.

As used herein the terms "styrene" and "polystyrene" are intended also to embrace, respectively, alpha-methyl styrene and polymers thereof, the term "polyterpene-type" is intended to include both natural resins, such as polymers of alpha- or beta- pinene, as well as synthetic hydrocarbon resins which are polymerized structures derived from aliphatic dienes and monoolefins of 5-6 carbon atoms. A majority of these structures are typically derived from piperylene and isoprene.

It will, of course, be recognized that, in addition to the components thus described, it may be desirable to incorporate anti-oxidants, dyes, pigments, fillers and the like into the adhesive composition.

BRIEF DESCRIPTION OF THE DRAWING

Understanding of the invention will be enhanced by referring to the accompanying drawing, in which the single figure depicts the relationship of the amounts of block copolymer (A), solid tackifier (B), and liquid tackifier (C) which provides satisfactory adhesives. Area I includes functional adhesives, with Areas II, III and IV defining increasingly preferred compositions.

DESCRIPTION OF TEST PROCEDURES

While the evaluation of a diaper closure tape is often highly subjective and virtually impossible to quantify, it has been found that three specific tests can be employed to determine whether a given tape (and more particularly the pressure-sensitive adhesive) possesses the properties which recommend it for use as an effective contamination-tolerant diaper closure. These tests will now be described in more detail.

Quick Stick. This test is a modification of Pressure Sensitive Tape Counsel test PSTC-5*, which measures the ability of a pressure-sensitive adhesive tape to adhere to a surface instantly. It is measured as a force resisting peeling of the tape at a 90° angle from a standard surface upon which it has been applied under no other pressure than the weight of the tape itself. In accordance with the modification, the test surface is a polyethylene film of the type commonly employed as the outer surface of a disposable diaper; this film is carefully and uniformly bonded to a steel test panel. The tape to be tested is placed in contact with the polyethylene film surface and rolled down with a 100-gram roller at a rate of 30.5 cm per minute. The force required to remove a strip of tape at 90° from the exposed surface of the polyethylene at a rate of 30.5 cm/minute should be at least about 100 grams per centimeter width, and preferably at least about 200 grams per centimeter width.

*Described in detail in "Test Methods for Pressure-Sensitive Tapes," 6th Edition, developed by the Specifications and Technical Committee of the Pressure-Sensitive Tape Counsel, 1201 Waukegan Road, Glenview, IL 60025.

Contamination Tolerance. This test is substantially identical to the "Quick Stick" test just described, except that the surface of the polyethylene is covered with talc and the excess shaken off, leaving approximately 2-2.5 grams of talc per square meter of polyethylene. The force required to remove the tape from the talc-contaminated polyethylene film should be at least about 15 grams, and preferably at least about 40 grams, per centimeter width.

Shear Adhesion. In this test, a 2.54-cm wide strip of tape is obtained and the adhesive surface partially masked, leaving exposed a 2.54-cm length of adhesive. The 2.54×2.54 cm square of adhesive is then placed in contact with the polyethylene cover of a section cut from a disposable diaper, and using a 500-gram roller, placed into firm contact. One end of the diaper section is then gripped in a pair of jaws, and a 1,000-gram weight connected to the free end of the tape. The time required for the tape to pull free from the polyethylene film is measured in minutes. A satisfactory shear adhesion value is considered to be at least one minute, and preferably at least about ten minutes.

DESCRIPTION OF PRESENTLY PREFERRED EMBODIMENTS

The invention will now be described with the aid of certain illustrative but non-limitative examples, all parts being by weight unless otherwise noted. The following abbreviations have been employed to refer to the various components of the adhesive systems:

Rubbery Block Copolymer

| ABBREVIATION | COMPONENT |
|---|---|
| K1107 | Styrene:isoprene:styrene block copolymer having a styrene:isoprene ratio of 14:86, and a Brookfield viscosity of 1600 cps at 25° C., (25% solution in toluene), commercially available from Shell Oil Company under the registered trademark "Kraton" 1107 |
| KG | Styrene:(ethylene-butylene):styrene block copolymer having a styrene:(ethylene-butylene) ratio of 28:72 and a Brookfield viscosity of 1500 cps at 25° C. (20% solution in toluene), commercially available from Shell Oil Company under the registered trademark "Kraton" G |
| S423P | Styrene:isoprene radial block copolymer having a styrene:isoprene ratio of 16:84 and a Brookfield viscosity of 2300 cps at 25° C. (25% solution in toluene), commercially available from Phillips Petroleum Company under the registered trademark "Solprene" 423P |

Tackifier Resins

| ABBREVIATION | COMPONENT |
|---|---|
| B115 | Polymerized beta-pinene having a ring-and-ball softening temperature of 115°-120° C., commercially available from Arizona Chemical Company under the registered trademark "Zonarez" B-115 |
| S115 | Polymerized beta-pinene having a ring-and-ball softening temperature of 115°-120° C., commercially available from Hercules, Inc. under the registered trademark "Piccolyte" S-115 |
| W 10 | Synthetic polyterpene resin having a molecular weight of 450, liquid at room temperature (ring-and-ball softening temperature of 10° C.), commercially available from the Goodyear Tire and Rubber Company under the registered trademark "Wingtack" 10. |
| W 76 | Synthetic polyterpene resin having a molecular weight of 850 and a ring-and-ball softening temperature of 76° C., commercially available from The Goodyear Tire and Rubber Company under the registered trademark "Wingtack" 76 |
| W Plus | Synthetic polyterpene resin having a molecular weight of 1100 and a ring-and-ball softening temperature of 94° C., commercially available from The Goodyear Tire and Rubber Company under the registered trademark "Wingtack" Plus |
| W 95 | Synthetic polyterpene resin having a molecular weight of 1200 and a ring-and-ball softening point of 100° C., commercially available from The Goodyear Tire and Rubber Company under the registered trademark "Wingtack" 95 |
| W115 | Synthetic polyterpene resin having a molecular weight of 1400 and a ring-and-ball softening temperature of 115°-120° C., commercially available from The Goodyear Tire and Rubber Company under the registered trademark "Wingtack" 115 |

In each case the adhesive to be evaluated was prepared by placing the block copolymer, liquid tackifier resin, solid tackifier resin, an antioxidant, and heptane in a suitable container and churning until a homogeneous adhesive composition containing 60-70% solids was obtained.

Tapes were prepared by coating the adhesive composition just described onto the face side of a polypropylene film tape backing (although treated crepe paper or other films can be employed) and evaporating the solvent by passing the coated film through heated forced air ovens to leave a dry pressure-sensitive adhesive coating weighing approximately 60 g/m² of backing.

TABLE I

| Example No. | Rubbery Block Copolymer Type | Parts | Solid Tackifier Resin Type | Parts | Liquid Tackifier Resin Type | Parts | Area on Graph | Quick Stick g/cm | Contamination Tolerance g/cm | Shear Adhesion, minutes |
|---|---|---|---|---|---|---|---|---|---|---|
| Comparison | K1107 | 3 | W115 | 42 | W10 | 55 | — | — | 2 | 11.8 |
| Comparison | " | 5 | " | 41 | " | 54 | — | rips polyethylene | 7.9 | 8.3 |
| 1 | " | 5 | " | 30 | " | 65 | I | " | 58.3 | 2.9 |
| 2 | " | 7 | " | 40 | " | 53 | III | " | 31.1 | 24.9 |
| 3 | " | 9.5 | " | 42.9 | " | 47.6 | I | 188 | 18.9 | 1.2 |
| 4 | " | 10 | " | 40 | " | 50 | IV | 331 | 18.5 | 35 |
| 5 | " | 10.5 | " | 36.8 | " | 52.6 | IV | 352 | 43.3 | 27.6 |
| 6 | " | 11.1 | " | 33.3 | " | 55.6 | III | 348 | 84.3 | 9.9 |
| 7 | " | 12.5 | " | 25 | " | 62.5 | I | 487 | 84.6 | 3.4 |
| 8 | " | 13.3 | " | 26.7 | " | 60 | II | 223 | 45.7 | 2.8 |
| 9 | " | 12.5 | B115 | 25 | " | 62.5 | I | 400 | 88.6 | 7.2 |
| 10 | " | 11.1 | S115 | 33.3 | " | 5.6 | II | 752 | 145.7 | 27 |
| 11 | " | 11.1 | W95 | 33.3 | " | 55.6 | II | 398 | 42.5 | 7.1 |
| 12 | " | 11.1 | W Plus | 33.3 | " | 55.6 | II | 433 | 76.3 | 9.4 |

TABLE I-continued

| Example No. | Rubbery Block Copolymer Type | Rubbery Block Copolymer Parts | Solid Tackifier Resin Type | Solid Tackifier Resin Parts | Liquid Tackifier Resin Type | Liquid Tackifier Resin Parts | Area on Graph | Quick Stick g/cm | Contamination Tolerance g/cm | Shear Adhesion, minutes |
|---|---|---|---|---|---|---|---|---|---|---|
| 13 | " | 11.1 | W76 | 33.3 | " | 55.6 | II | 379 | 63.7 | 5.1 |
| 14 | KG | 11.1 | W115 | 33.3 | " | 55.6 | II | 217 | 30.3 | 14 |
| 15 | S423P | 11.1 | " | 33.3 | " | 55.6 | II | 687 | 78.7 | 15 |
| 16 | " | 12.5 | " | 25 | " | 62.5 | I | 499 | 84.6 | 3.4 |

It has been found that if an insufficient amount of liquid tackifier (or, correspondingly, an excessive amount of solid tackifier, rubbery block polymer, or both) is employed, the adhesive composition has good shear properties but lacks the desired degree of contamination tolerance. On the other hand, if an excessive amount of liquid tackifier (or, correspondingly, an insufficient amount of solid tackifier, rubbery-block polymer, or both) is employed, the adhesive composition has good contamination tolerance but lacks the desired degree of shear adhesion. The lines of the drawing define adhesive compositions which show a balance of quick stick, contamination tolerance, and shear adhesion.

The term "tape" in the appended claims refers both to structures in which the adhesive is firmly bonded to a conventional backing and to structures in which the adhesive is removably bonded to the release-coated surface of a backing. Tapes of the latter type, commonly known as "transfer tapes," can be applied to a desired substrate and the release liner backing removed to expose the other side of the adhesive layer. A second substrate can then be adhered to the exposed surface.

We claim:

1. Pressure-sensitive tape comprising a sheet backing coated with a layer of normally tacky and pressure-sensitive adhesive which is not only capable of maintaining useful bonding properties even after its surface has been contaminated with talc but which also has good shear adhesion, a force of at least 15 grams per centimeter width being required to remove said pressure-sensitive tape from a talc-contaminated polyethylene film, said adhesive consisting essentially of a blend of 100 parts by weight of (a) 5-25 parts by weight of a rubbery synthetic block copolymer selected from the class consisting of:

(1) A-B, A-B-A or blends of A-B and A-B-A wherein A is a polymer of styrene and B is selected from the class consisting of homopolymers of isoprene and copolymers of ethylene and butylene and (2) radial or teleblock copolymer consisting of several polystyrene-terminated elastomeric branches, each of said branches being a homopolymer of isoprene extending from a central hub;

(b) 15-50 parts by weight of polyterpene-type tackifier resin which is solid at room temperature; and (c) 40-75 parts by weight of a polyterpene-type tackifier resin which is liquid at room temperature.

2. The tape of claim 1 wherein the adhesive composition falls within area I on the accompanying drawing.

3. The tape of claim 1 wherein the adhesive composition falls within area II on the accompanying drawing.

4. The tape of claim 3 wherein the rubbery block copolymer is a linear styrene:isoprene:styrene copolymer containing about 10-20% styrene.

5. The tape of claim 3 wherein the rubbery block copolymer is a radial or teleblock copolymer consisting of several polystyrene-terminated elastomeric branches, each of said branches being a homopolymer of isoprene extending from a central hub.

6. The tape of claim 1 wherein the adhesive composition falls within area III on the accompanying drawing.

7. The tape of claim 6 wherein the rubbery block copolymer is a styrene:isoprene:styrene copolymer containing about 10-20% styrene.

8. The tape of claim 6 wherein the rubbery block copolymer is a radial or teleblock copolymer consisting of several polystyrene-terminated elastomeric branches, each of said branches being a homopolymer of isoprene extending from a central hub.

9. The tape of claim 1 wherein the adhesive composition falls within area IV on the accompanying drawing.

10. The tape of claim 9 wherein the rubbery block copolymer is a styrene:isoprene:styrene copolymer containing about 10-20% styrene.

11. The tape of claim 9 wherein the rubbery block copolymer is a radial or teleblock copolymer consisting of several polystyrene-terminated elastomeric branches, each of said branches being a homopolymer of isoprene extending from a central hub.

* * * * *

UNITED STATES PATENT AND TRADEMARK OFFICE
CERTIFICATE OF CORRECTION

PATENT NO. : 4,163,077

DATED : July 31, 1979

INVENTOR(S) : Stephen A. Antonsen and David P. Boaz

It is certified that error appears in the above–identified patent and that said Letters Patent are hereby corrected as shown below:

Col. 4, TABLE I, Comparison "10" under the heading "Liquid Tackifier Resin", "5.6" should read --55.6--.

Signed and Sealed this

Thirteenth Day of November 1979

[SEAL]

Attest:

RUTH C. MASON
Attesting Officer

LUTRELLE F. PARKER
Acting Commissioner of Patents and Trademarks